F. C. MEARS.
PARACHUTE FOR USE WITH AEROPLANES.
APPLICATION FILED JULY 1, 1919.
1,395,723. Patented Nov. 1, 1921.
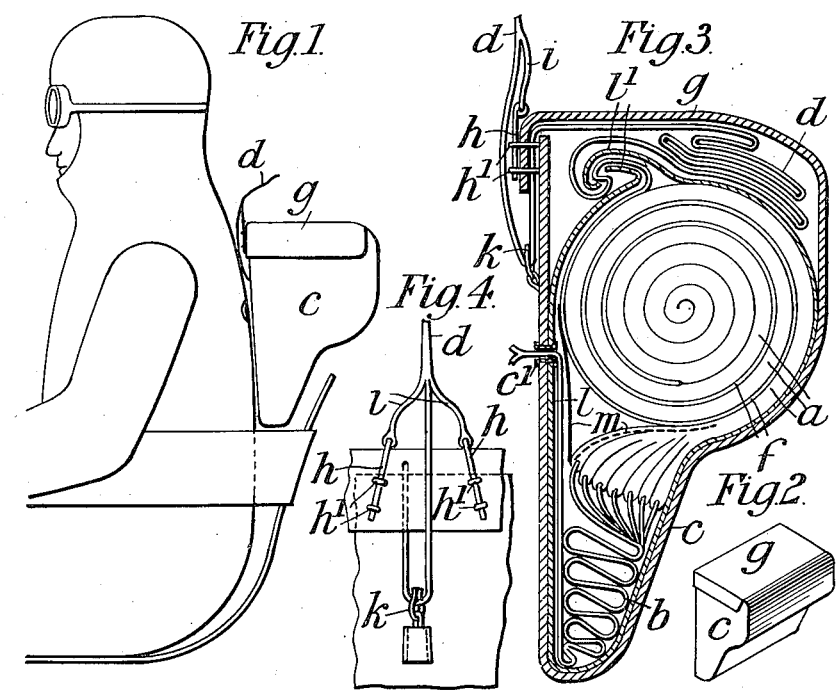
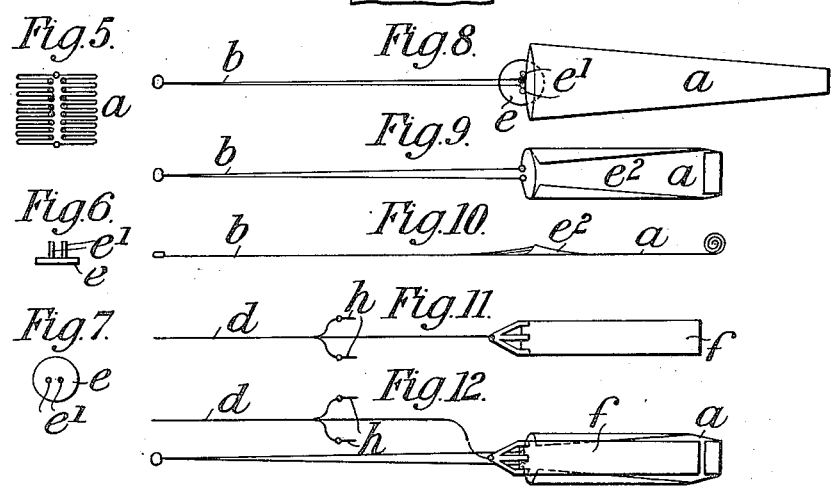
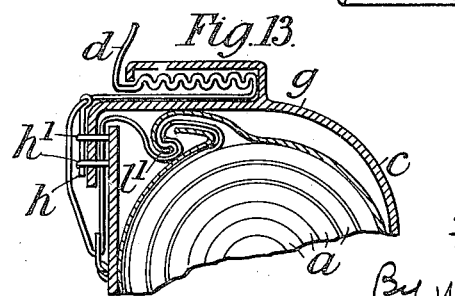
Witness
J. K. Moore
Inventor.
Frank C. Mears
By Whitaker & Prevost
Attys

UNITED STATES PATENT OFFICE.

FRANK CHARLES MEARS, OF EDINBURGH, SCOTLAND.

PARACHUTE FOR USE WITH AEROPLANES.

1,395,723.        Specification of Letters Patent.        Patented Nov. 1, 1921.

Application filed July 1, 1919. Serial No. 307,966.

*To all whom it may concern:*

Be it known that I, FRANK CHARLES MEARS, a subject of the King of Great Britain, residing at 4 Forres street, Edinburgh, Scotland, have invented new and useful Improvements in Parachutes for Use with Aeroplanes, of which the following is a specification.

My invention relates to parachute equipment chiefly intended for use with aeroplanes but also applicable for use with other aircraft.

Parachutes now generally used are carried in a case designed to be attached to the fuselage of an aeroplane in such a position that when the person using the parachute jumps, the parachute will be drawn out of its case.

With such an arrangement, however, there is a danger of the parachute fouling or coming into contact with some part of the aeroplane, as the parachute, under the air pressure (due to the velocity of the aeroplane) which acts against it when withdrawn from its case will immediately be blown backward past the tail, with which it sometimes makes contact.

The object of my invention is to overcome this difficulty and to this end my invention consists mainly in arranging the parachute in a case which is secured to the airman himself and in combining therewith a rope or the like designed to be firmly secured at one end to the aeroplane and having at the other end devices for opening the case, pulling the parachute therefrom and unfolding it, the said rope or the like being of sufficient length to allow the airman to fall clear of the machine with the parachute before the latter is pulled out of its case.

To enable my invention to be fully understood, I will describe a suitable arrangement for carrying it into practice by reference to the accompanying drawing, in which:—

Figure 1 is a side view showing the parachute equipment applied upon an aviator; and, Fig. 2 is a perspective view of the case detached.

Fig. 3 is a sectional side view drawn to a larger scale than Figs. 1 and 2 showing the parachute housed in the case.

Fig. 4 is a view of a portion of the left hand side of Fig. 3 showing the arrangement for fastening the case.

Figs. 5 to 10 are views, hereinafter referred to, illustrating a method of folding the parachute; and, Figs. 11 and 12 are views illustrating the means which I advantageously employ for unfolding the parachute as it is withdrawn from the case.

Fig. 13 is a view similar to Fig. 3 illustrating a modification.

$a$ indicates the envelop of the parachute and $b, b$ the rigging the cords of which are connected to a harness, not shown, to be applied to the airman's body.

$c$ is the case in which the parachute is folded and packed or housed in such a manner that it can be withdrawn therefrom without the liability of entanglement, the said case being applied to the airman's back by straps, not shown, so that it will be held in position thereon, and having in it a hole $c^1$ through which the rope or group of ropes attached to the harness is passed. The said case is preferably made of water-proof canvas.

$d$ is the rope through the medium of which the parachute is pulled out of the case the said rope being, say, 15 or more feet in length and being at one end securely fixed to the aircraft and at the other end connected to the parachute envelop $a$, so that, after the parachute is withdrawn from the case and unfolded, it will be automatically detached from the envelop.

To provide for this automatic detachment of the rope from the parachute I advantageously fold and house it as follows: that is to say, I spread out the parachute envelop on a flat surface and fold the panels of the said envelop symmetrically, as shown diagrammatically in end elevation in Fig. 5 bringing all the eyelets, to which the bridles constituting the parachute rigging are spliced, to the center, so that they lie one upon the other, this being facilitated by the use of what I term a packing tool (shown detached in Figs. 6 and 7 and in position for use in Fig. 8) consisting of a board $e$ having on it two pins $e^1$, $e^1$ between which the rings are placed. The cap thus folded is then tightly rolled up from the top, as shown in Figs. 9 and 10, for part of its length the sides being folded in as at $c^2$ so as to keep the roll to the width of the case.

A strip of canvas $f$, Fig. 11, somewhat less in width than the folded envelop of the parachute is then laid upon the unrolled portion thereof as in Fig. 12 and so that during the further rolling, the said strip will be tightly rolled in with the parachute, as will be readily understood by reference to Fig. 3, this strip of canvas at its outer end being firmly secured to the rope $d$ in such a manner that when the airman jumps and strains the rope the parachute will not only be pulled out of the case but the envelop will also be unrolled so that it will readily spread itself under the air pressure to afford the necessary support to the airman.

The case $c$ is provided with a cover $g$ which is normally closed over the parachute and retained, say, by means of pins $h$, $h$ passed through staples $h^1$, of leather or other flexible material, on the case, the said pins being themselves attached to branch ropes $i$, $i$ spliced on to the rope $d$ so that when the airman falls, the said pins will be withdrawn and leave the cover $g$ free to be thrown back as the parachute presses against it.

In practice, these branch ropes $i$, $i$ will be relatively near to the point at which the rope $d$ is attached to the aeroplane and the other portion of the said rope will be coiled inside the envelop as shown in Fig. 3. Or, instead of such an arrangement the rope $d$ may be coiled inside a suitable recess on the cover $g$, as shown in Fig. 13. This arrangement for normally housing the rope will prevent the latter from flying out in the wind during the normal travel of an aeroplane while at the same time leaving it perfectly free to be pulled out when required.

As a precaution against the pressure of wind upon the exposed portion of the rope pulling out the pins $h$, $h$ I advantageously loop the rope through a spring clip $k$, Figs. 3 and 4, or other device which will readily release the said rope when the weight of the airman is thrown upon it.

In practice the case $c$ is advantageously provided with an inner lining $l$ of balloon fabric as an additional safeguard against damp, the upper portion of the lining being in the form of flaps $l^1$, $l^1$ which can be folded over the rolled up parachute, as indicated in Figs. 3 and 4, or Fig. 13.

Furthermore, means may be provided for effecting the positive opening of the parachute. For example, I may attach to the strip $f$, a short strip of fabric $m$, the free end of which is passed into the folds of the mouth of the parachute, as shown in Fig. 3. With this arrangement the mouth is drawn slightly open at the commencement of the unrolling of the parachute thus insuring that air has access to the latter.

The operation of the apparatus is as follows:—that is to say, upon the airman jumping out of the aircraft his weight causes the rope $d$ to become sufficiently taut to pull out the pins $h$, $h$ from the staples $h^1$ on the casing $c$ thus releasing the cover $g$ and allowing the remainder of the said rope to uncoil. When the rope $d$ is fully extended the parachute is lifted out of the case and the canvas strip $f$ comes into operation and unrolls the parachute which is then entirely free of the aeroplane, the rope $d$ with the said canvas strip remaining behind upon the aeroplane, while the case $c$ itself after the parachute is withdrawn therefrom, will remain upon the back of the airman.

In addition to the advantages before described my invention possesses the further advantage that the apparatus is of simple and cheap construction, that its compactness permits of the apparatus being applied to any kind of aircraft, that the unrolling of the parachute is positively performed, and that there are no metal parts to be damaged by gun fire.

Having now particularly described and ascertained the nature of my said invention, and in what manner the same is to be performed, I declare that what I claim is:—

1. A parachute equipment for use with aircraft comprising a container carried directly by the airman, a parachute normally housed in said container and means positively connected with the aircraft and detachably connected with said parachute for automatically abstracting said parachute from the container and means for unrolling the parachute when the airman has jumped clear of the aircraft.

2. In a combination of the kind claimed in claim 1, the arrangement in conjunction with the rope which pulls the parachute out of its case of means connected with said rope for unfolding or unrolling the envelop of the parachute, substantially as described.

3. The combination with a cord adapted to have one of its ends fixed to an aircraft, of a parachute normally housed within a latched case carried upon the airman's body and detachably connected to the other end of said cord, said cord being of sufficient length to remove the parachute from the case after the airman has jumped clear of the aircraft, and means connected to said cord for unlatching the case when the cord is drawn taut.

4. The combination with a case adapted to be secured to an airman's body, of a parachute in rolled form contained in said case and having one of its ends fixed to the airman's body, and a cord for removing the parachute from the case having one end adapted to be fixed to an aircraft and provided at its other end with unrolling means contained within the rolled parachute, said cord being of sufficient length to permit the airman to jump clear of the aircraft before the cord carried unrolling means draws the parachute from its case and unrolls the same.

5. A parachute equipment for use with aircraft comprising a container positively secured to the airman, a parachute normally housed in said container, a member for abstracting said parachute from said container when the airman has jumped clear of the aircraft, one end of said member being positively connected to the aircraft and a strip of material attached to the other end of said member, said strip being spirally folded with the parachute body in the container.

6. A parachute equipment for use with aircraft comprising a container positively secured to the airman, a parachute normally housed in said container, a member for abstracting said parachute from said container when the airman has jumped clear of the aircraft, one end of said member being positively connected to the aircraft, a strip of material attached to the other end of said member, said strip being spirally folded with the parachute body in the container, a cover for said container and means for normally locking the cover of said container and means for automatically releasing said cover as the airman jumps clear of the aircraft to permit of the abstraction of the parachute and its associated parts.

FRANK CHARLES MEARS.

Witnesses:
 ROBT. J. R. FLETT,
 JOHN ROSS.